United States Patent
Ide (10) Patent No.: US 7,702,714 B2
(45) Date of Patent: Apr. 20, 2010

(54) PAIRWISE SYMMETRY DECOMPOSITION METHOD FOR GENERALIZED COVARIANCE ANALYSIS

(75) Inventor: Tsuyoshi Ide, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 240 days.

(21) Appl. No.: 11/548,278

(22) Filed: Oct. 10, 2006

(65) Prior Publication Data

US 2007/0192066 A1 Aug. 16, 2007

(30) Foreign Application Priority Data

Oct. 13, 2005 (JP) .............................. 2005-299028

(51) Int. Cl.
*G06F 17/15* (2006.01)
(52) U.S. Cl. ...................................... 708/424; 708/422
(58) Field of Classification Search ................. 708/200, 708/422–446
See application file for complete search history.

(56) References Cited

U.S. PATENT DOCUMENTS

| | | | | |
|---|---|---|---|---|
| 5,046,179 A | * | 9/1991 | Uomori et al. | 708/422 |
| 5,257,364 A | * | 10/1993 | Melamed et al. | 708/421 |
| 7,320,014 B2 | * | 1/2008 | Letts | 708/422 |
| 7,346,593 B2 | * | 3/2008 | Takeuchi et al. | 708/446 |
| 2005/0002054 A1 | * | 1/2005 | Shoji et al. | 358/1.14 |
| 2005/0050129 A1 | * | 3/2005 | Kamatani et al. | 708/422 |
| 2007/0005297 A1 | * | 1/2007 | Beresniewicz et al. | 702/181 |

* cited by examiner

*Primary Examiner*—Chat C Do
(74) *Attorney, Agent, or Firm*—Ido Tuchman; Shimokaji & Associates, P.C.

(57) ABSTRACT

The present invention provides a system for evaluating a correlation between a plurality of time-series data. The system includes a calculating section which calculates characteristic quantities indicating symmetry of a diagram drawn by a graph, on which data values included in the plurality of time-series data are plotted in a multidimensional space in which each coordinate axis represents the data value of each time-series data; and an evaluating section which evaluates the correlation between the plurality of time-series data, based on the calculated characteristic quantities.

3 Claims, 9 Drawing Sheets

FIRST OBSERVATION PART

SECOND OBSERVATION PART (b)

PAIRWISE SYMMETRY DECOMPOSITION METHOD FOR GENERALIZED COVARIANCE ANALYSIS

CROSS-REFERENCE TO RELATED APPLICATIONS

This application claims priority under 35 U.S.C. § 119 to Japanese Patent Application No. 2005-299028 filed Oct. 13, 2005, the entire text of which is specifically incorporated by reference herein.

BACKGROUND OF THE INVENTION

The present invention relates to a system and method of evaluating a correlation. More particularly, the invention relates to a system and method of evaluating a correlation between a plurality of time-series data.

Analysis of a correlation between observed data obtained from each part of a given observation object is effective for detection of a failure occurring inside the observation object. When an automobile, for example, is under observation, it is hard to detect a failure of the automobile by observing only the gear position of the automobile. Detection of a failure occurring inside the automobile, however, can be often achieved by detecting another observed data, e.g., a value of the engine speed in a case where the gear of the automobile is at a given position.

There has been heretofore widely used the technique of analyzing a correlation between a plurality of variables taking on consecutive values, based on a covariance matrix. This technique permits analysis of a linear correlation such that one variable having a large variable value leads to another variable also tending to have a large variable value. Specifically, an empirical distribution is defined as Equation (1) below, provided that time-series data of observed data are N-dimensional vector variables x. Then, a covariance matrix is defined as $<xx^T>$, provided that the expectation value over the data is expressed as $<\bullet>$. It will be hereinafter understood that the mean of the data is prenormalized to zero. Also, each element of a correlation coefficient matrix C is defined as Equation (2) below.

$$p_{emp}(x) = \frac{1}{N}\sum_{t=1}^{T}\delta(x - x(t)) \quad (1)$$

$$C_{i,j} = \frac{\langle x_i x_j \rangle}{\sqrt{\langle x_i^2 \rangle \langle x_j^2 \rangle}} \quad (2)$$

It will be hereinafter understood that $\delta$ represents a Dirac delta function when observed data takes on continuous values, or $\delta$ represents a Kronecker delta function when observed data takes on discrete values.

Even if each element of a covariance matrix is zero as to a set of given variables, the variables, however, are not limited to having no correlation. For example, when an empirical distribution is expressed by Equation (3) below, $p(x_i|x_j)$ is an even function of $x_i$. Thus, a correlation coefficient is zero as expressed by Equation (4) below.

$$p(x_i | x_j) = \frac{1}{2}\left[\delta\left(x_i + \sqrt{r^2 - x_j^2}\right) + \delta\left(x_i - \sqrt{r^2 - x_j^2}\right)\right] \quad (3)$$

$$\langle x_i x_j \rangle = \int dx_i dx_j p(x_j) p(x_i|x_j) x_i x_j = 0 \quad (4)$$

As can be seen from Equation (3), the variable values of the variables, however, are distributed around the circumference of a circle with a radius r. As mentioned above, a very strong correlation may exist between the variables even if each element of the covariance matrix is zero.

Furthermore, kernel methods recently have come into use as an approach for incorporating a nonlinear correlation in the field of machine learning. The kernel method, when applied, involves using a kernel function K to substitute $<K(x',x)>$ for $<xx^T>$ which is the base quantity of covariance structural analysis. This permits kernel principal component analysis or the like. For example, a polynomial kernel is defined as $(x^T y)^d$, where x and y denote vectors and d denotes a natural number. In this example, assuming d=2 leads to the kernel function defining nonlinear mapping as expressed by Equation (5).

$$\Phi(x) = [x_1^2, x_2^2, \ldots, x_n^2, \sqrt{2}x_1 x_2, \ldots, \sqrt{2}x_{n-1}x_n]^T \quad (5)$$

In other words, the inner product $\Phi(x)^T\Phi(y)$ matches the kernel function. Accordingly, the quantity, as expressed as $<\Phi(x)\Phi(y)^T>$, can be therefore considered as an extension of the covariance matrix, so that principal component analysis can be performed on this matrix. Consequently, the matrix can yield features on which nonlinear correlations reflect. Incidentally, Equation (5) is illustrative, and $\Phi(x)$ is not limited to this illustrative example but may be in the form of such map as cannot be explicitly expressed.

However, the kernel method uses a black box called the kernel function for incorporation of nonlinearity, which takes place in the black box. In other words, the kernel method is illustrative only of a general method of incorporating nonlinearity, and is incapable of detecting particular nonlinearity for detection of a correlation between variables.

BRIEF SUMMARY OF THE INVENTION

An object of the present invention is therefore to provide a system, method and program capable of solving the foregoing problems. The object is attained by use of combinations of characteristics as recited in the independent claims in the scope of claims. In addition, the dependent claims specify more advantageous specific examples of the present invention.

To solve the foregoing problems, the present invention provides a system, method and program for evaluating a correlation between a plurality of time-series data. The system comprises a calculating section which calculates characteristic quantities indicating the nonlinear correlations existing between the plurality of time-series data; and an evaluating section which evaluates the correlation between the plurality of time-series data, based on the calculated characteristic quantities.

The calculating section may calculate characteristic quantities indicating symmetry of a diagram drawn by a graph, on which data values included in the plurality of time-series data are plotted in a multidimensional space in which each coordinate axis represents the data value of each time-series data.

Incidentally, the above summary of the invention does not give all necessary features of the present invention, and therefore, subcombinations of these feature groups may be also embraced by the invention.

DETAILED DESCRIPTION OF THE INVENTION

Although the present invention will be described below with reference to an embodiment of the invention, it is to be understood that the embodiment is not intended to limit the invention as recited in the claims, and the invention does not necessarily require all combinations of features as set forth in the description of the embodiment.

Figure 1:
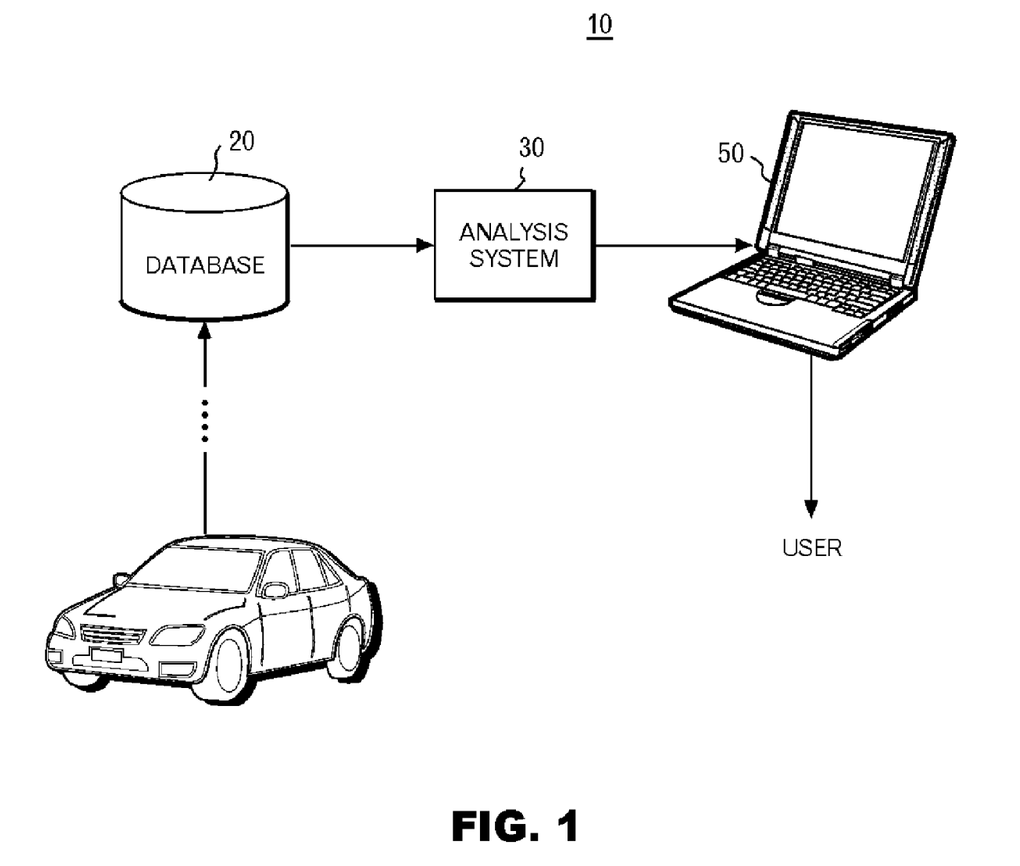
FIG. 1 shows the general configuration of an information processing system 10.

FIG. 1 shows the general configuration of an information processing system 10. The information processing system 10 includes a database 20, an analysis system 30, and a user terminal 50. The database 20 contains a plurality of observed data, which are obtained as a result of observing, in time sequence, each part of an automobile which is an observation object. For example, the observed data are time-series data as which observed values are stored. The observed values are obtained by using a sensor mounted to a given part of the automobile, specifically by the sensor performing observations every moment while the automobile is running. The observation objects may include an engine speed of the automobile, a shift position of a shift lever, and the utilization of a CPU (central processing unit) for control.

The analysis system 30 evaluates a correlation between a plurality of observed data. The user terminal 50 provides display of a correlation for a user in accordance with an instruction from the analysis system 30. The analysis system 30 according to the embodiment is designed for detection of a nonlinear correlation between the plurality of observed data, which has been heretofore inadequately detected, to thereby facilitate locating a part causing an abnormal condition in the automobile or the like.

Figure 2:
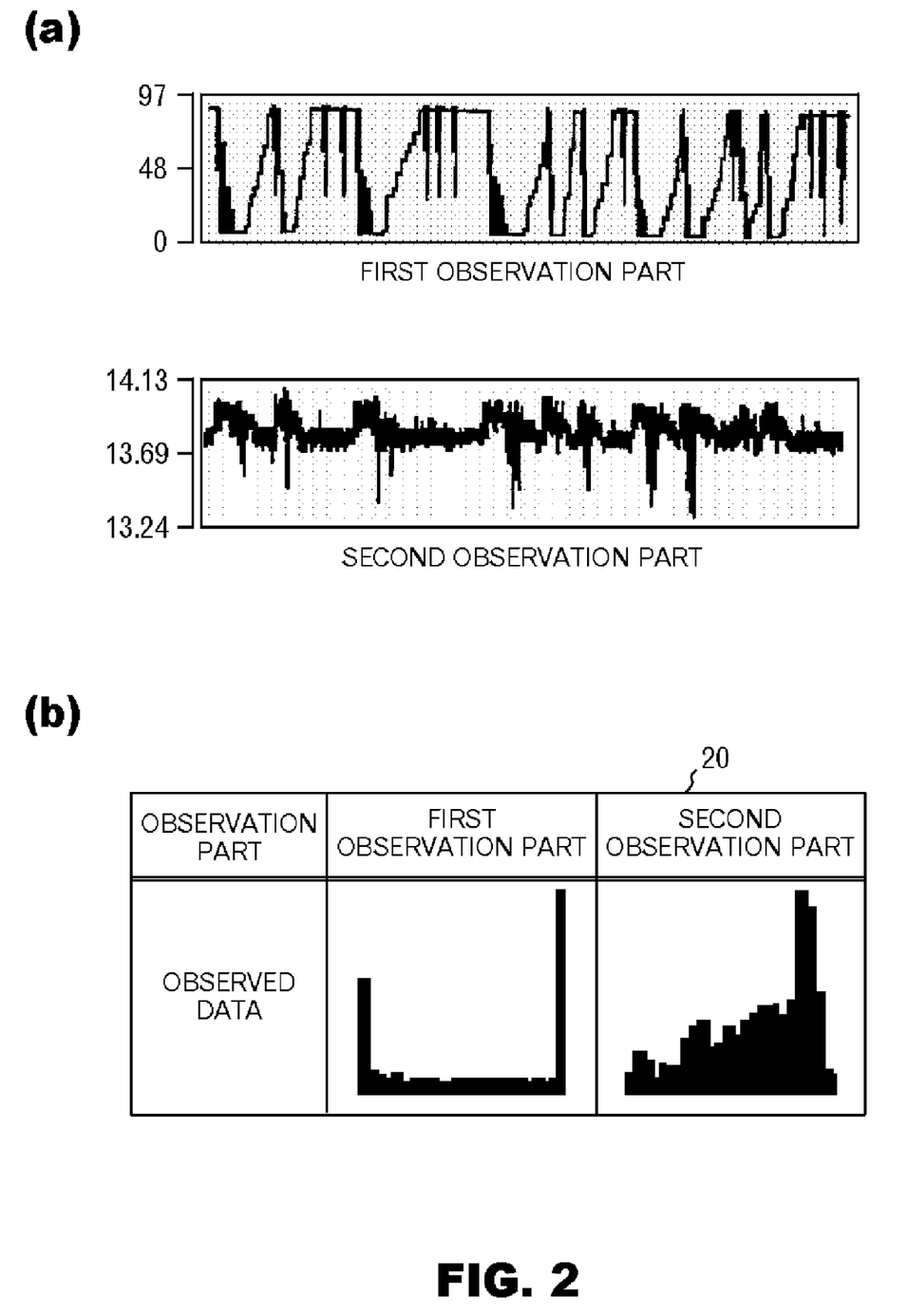
FIGS. 2A and 2B show an example of observed data contained in a database 20.

FIGS. 2A and 2B show an example of observed data contained in the database 20. The database 20 contains observed data obtained from each of plural parts included in the observation object. FIG. 2A shows the observed data as time-series data. For example, the observed value of a first observation part lies between 0 and 100 and repeatedly varies in relatively long cycles. The observed value of a second observation part lies in the neighborhood of 14 and varies in short cycles, and often decreases to close to 13. Although the observed value, as employed in the embodiment, is data having no unit, the observed value may be actually data having the unit of the number of times, weight, length or size or other units.

FIG. 2B shows the observed data as a probability density distribution. In FIG. 2B, the horizontal axis indicates the observed value, and the vertical axis indicates the number or frequency of observations of each observed value. For example, the observed value of the first observation part takes on two values, approximately 100 or 0, and does not tend to take on values therebetween. The observed value of the second observation part often takes on values on the order of approximately 14, and the frequency of its taking on other values decreases gradually as the value goes away from about 14.

Figure 3:
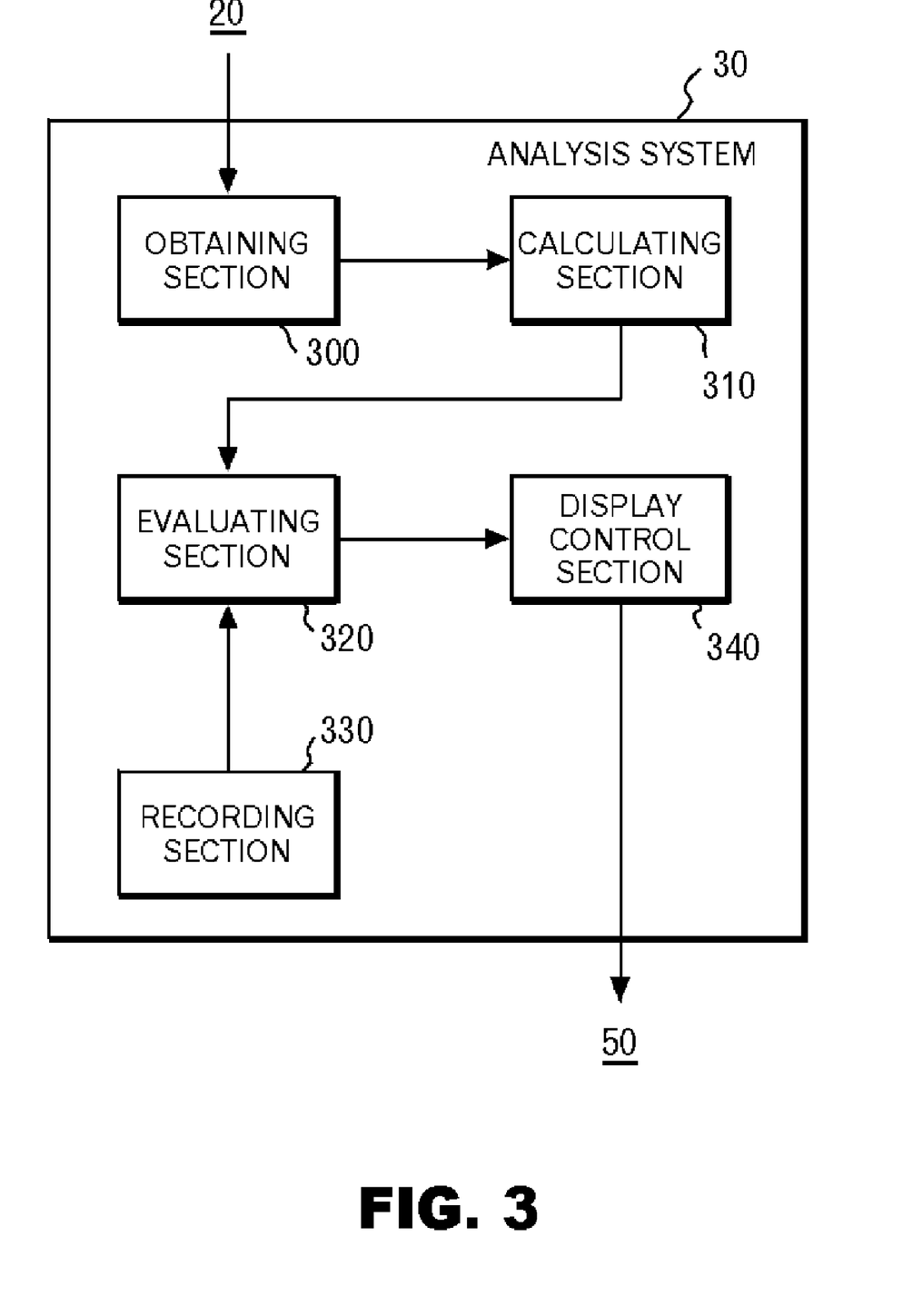
FIG. 3 shows the functional configuration of an analysis system 30.

FIG. 3 shows the functional configuration of the analysis system 30. The analysis system 30 includes an obtaining section 300, a calculating section 310, an evaluating section 320, a recording section 330, and a display control section 340. The obtaining section 300 obtains a plurality of observed data from the database 20. The calculating section 310 performs calculation on a combination of one observed data and another observed data to determine characteristic quantities indicating a nonlinear correlation existing between the one and another observed data. For example, the calculating section 310 calculates characteristic quantities indicating symmetry of a diagram drawn by a graph, on which data values included in the plurality of observed data are plotted in a multidimensional space in which each coordinate axis represents the data value of each observed data.

The evaluating section 320 evaluates the correlation between the plurality of observed data, based on the calculated characteristic quantities. For example, the evaluating section 320 can detect a part causing an abnormal condition in the observation object, based on each of the calculated characteristic quantities. The recording section 330 prerecords the characteristic quantities indicating a correlation existing between each of a plurality of observed data and any other of the plurality of observed data, which are obtained as a result of observing, in time sequence, each part of the observation object under normal conditions.

The display control section 340 provides display of a two-dimensional coordinate plane in which the x axis is assigned one observed data and the y axis is assigned another observed data. The display control section 340 provides display of a diagram in the two-dimensional coordinate plane, and the diagram shows a differential value between the characteristic quantities obtained by performing calculation on a combination of one observed data and another observed data. The display control section 340 can provide display of the diagram in the coordinate plane, for example on a screen of the user terminal 50.

Figure 4:
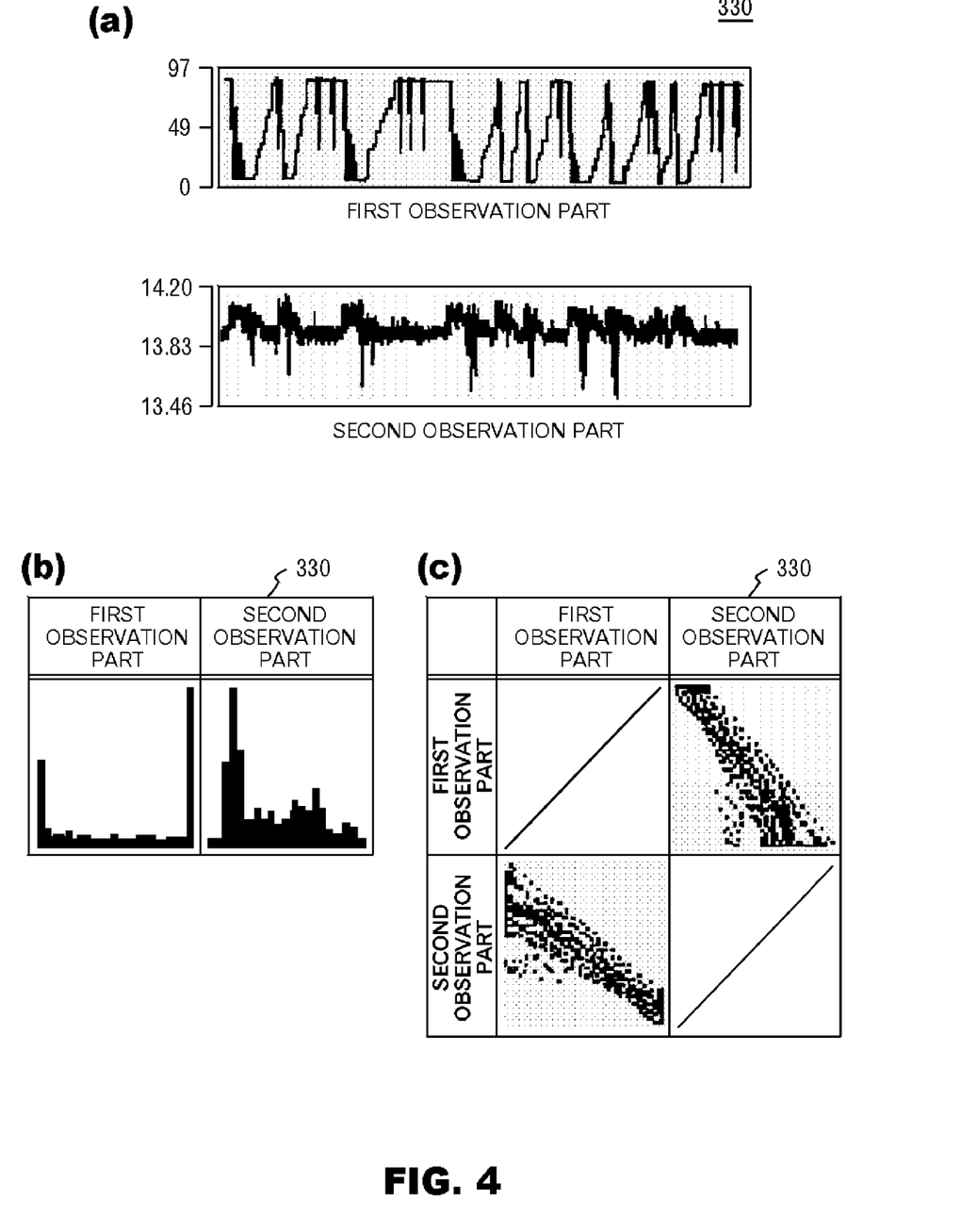
FIGS. 4A to 4C show an example of observed data recorded in a recording section 330.

FIGS. 4A to 4C show an example of observed data recorded in the recording section 330. FIG. 4A shows, in graphical form, a plurality of observed data obtained as a result of observing, in time sequence, each part of the observation object under normal conditions. FIG. 4B shows observed values included in the observed data of the observation object under normal conditions, in the form of a probability density distribution. The recording section 330 can record such time-series data as observed data.

FIG. 4C shows the correlations between each of a plurality of observed data and any other of the plurality of observed data, which are obtained as a result of observing, in time sequence, each part of the observation object under normal conditions. A diagram at the upper right of FIG. 4C shows a graph on which a set of observed values obtained at each time is plotted, in which the y coordinate is assigned the observed value obtained from the first observation part and the x coordinate is assigned the observed value obtained from the second observation part at the same time. Likewise, a diagram at the lower left of FIG. 4C shows a graph on which a set of observed values obtained at each time is plotted, in which the x coordinate is assigned the observed value obtained from the first observation part and the y coordinate is assigned the observed value obtained from the second observation part at the same time.

Although it is not necessary to compute the correlation of a given observation part with respect to itself, a graph showing the correlation of the first observation part with itself and a graph showing the correlation of the second observation part with itself are shown at the upper left and lower right, respectively, of FIG. 4C. For example, it is apparent from FIG. 4C that the first observation part has a linear positive correlation with itself. Thus, the graph, on which the observed values are plotted in the two-dimensional plane in which the x and y axes are each assigned the observed value of the first observation part, has a gradient of 1 and shows direct proportionality. The second observation part has a linear positive correlation with itself, as in the case of the first observation part.

On the other hand, when the respective observed values of the first and second observation parts are plotted in the two-dimensional plane, the plotted points are distributed near a straight line having a gradient of approximately −1. Thus, the correlation existing between a plurality of observed data can be inferred to some extent from the geometry of the diagram drawn in the multidimensional space in which each of the plurality of observed data is assigned to the corresponding coordinate axis. The recording section 330 records the characteristic quantities based on the symmetry of such a diagram, as the characteristic quantities indicating a correlation between one observed data and another observed data under normal conditions.

Figure 5:
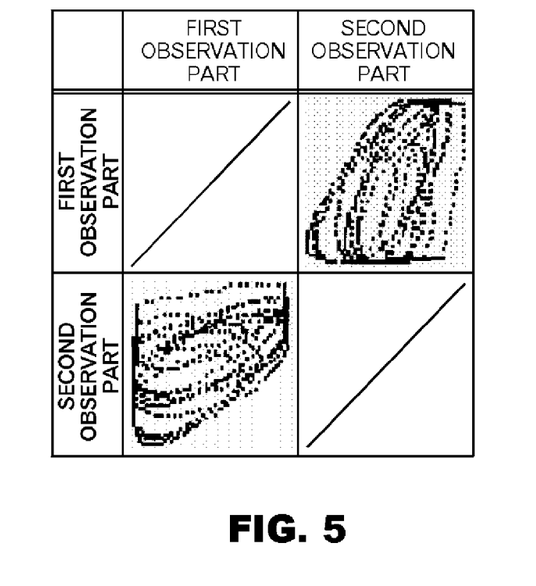
FIG. 5 shows an example of graphs, each on which observed data obtained by an obtaining section 300 is plotted in a two-dimensional plane.

FIG. 5 shows an example of graphs, each on which observed data obtained by the obtaining section 300 is plotted in a two-dimensional plane. In the same manner shown in FIG. 4C, a diagram at the upper right of FIG. 5 shows a graph on which a set of observed values obtained at each time is plotted, in which the y coordinate is assigned the observed value obtained from the first observation part and the x coordinate is assigned the observed value obtained from the second observation part at the same time. Likewise, a diagram at the lower left of FIG. 5 shows a graph on which a set of observed values obtained at each time is plotted, in which the x coordinate is assigned the observed value obtained from the first observation part and the y coordinate is assigned the observed value obtained from the second observation part at the same time. However, these observed values are obtained from a part in the automobile under a potentially abnormal condition, as distinct from those shown in FIG. 4C.

Visual comparison of FIG. 4C with FIG. 5 shows that there is a difference in the distributions of the data points. Thus, the correlation between the first and second observation parts under the normal condition seems to be different from that under a potential abnormal condition. Therefore, the first and second observation parts can be also considered to be the parts causing a failure in the automobile. However, when a test is made on a highly complex product such as an automobile, there may be often subtle variations in observed data depending on the test environment even under the same normal condition. Thus, a difference in the geometry of the diagram does not lead directly to the determination that the part showing the difference is the part where an abnormal condition occurs. Hence, even skilled engineers would have difficulty in making a determination as to whether an abnormal condition occurs, based on visual comparison between the geometries of the graphs. The analysis system 30 according to the embodiment can calculate the characteristic quantities of the diagram drawn by the graph showing the correlation, thereby adequately determining a difference in the correlation, and thus providing assistance in anomaly analysis.

Figure 6:
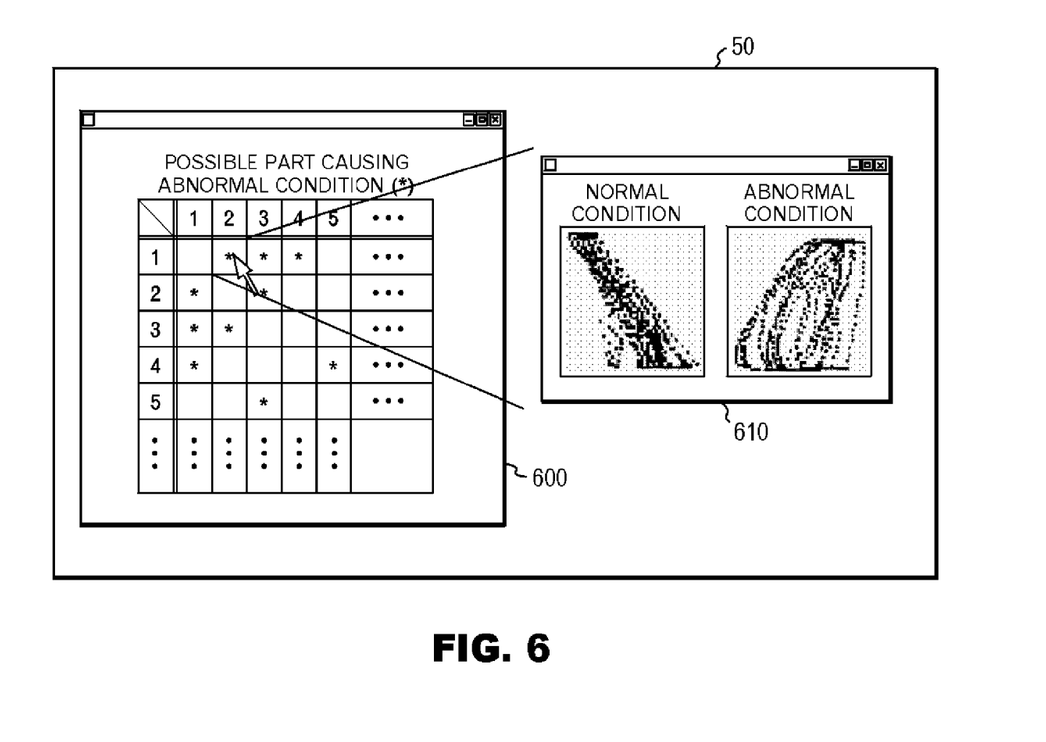
FIG. 6 shows an example of a display screen, which appears on a user terminal 50 under control of a display control section 340.

FIG. 6 shows an example of a display screen, which appears on the user terminal 50 under control of the display control section 340. The display control section 340 provides display so that windows 600 and 610 appear on the screen. The display control section 340 provides display so that a two-dimensional coordinate plane is displayed in tabular form in the window 600. Then, the display control section 340 provides display so that one observed data and another observed data are displayed as assigned to the x and y axes, respectively, in the two-dimensional coordinate plane. Specifically, the display control section 340 provides display so that the numbers (1, 2, 3, 4, 5, . . . ) of the observation parts for each observed data are displayed on the x axis. Likewise, the display control section 340 provides display so that the numbers (1, 2, 3, 4, 5, . . . ) of the observation parts for each observed data are displayed on the y axis.

Then, the display control section 340 provides display so that a diagram is displayed in the two-dimensional coordinate plane, and the diagram shows a differential value between the characteristic quantities obtained by performing calculation on a combination of one observed data and another observed data. In the example shown in FIG. 6, the display control section 340 provides display so that a mark "*" is displayed on the corresponding axis, provided that the differential value is larger than a predetermined reference value. Alternatively, the display control section 340 may provide display so that the diagram is displayed in deeper red as the differential value between the characteristic quantities becomes larger. This enables the intuitive display, like thermography, of a part suspected of causing an abnormal condition, thus calling user's attention to the part.

The display control section 340 also provides display in response to a user clicking on a given diagram in the two-dimensional plane, so that a graph showing a correlation under a normal condition and a graph showing a correlation under a possible abnormal condition are displayed as arranged next to each other in the window 610. For example, the display control section 340 provides display of a graph showing the correlation between the first and second observation parts, in response to a click on a diagram corresponding to a set of the first and second observation parts. This allows the user to intuitively grasp an observation part suspected of causing an abnormal condition, thus permitting the user to review the cause of the abnormal condition in further detail as needed.

Figure 7:
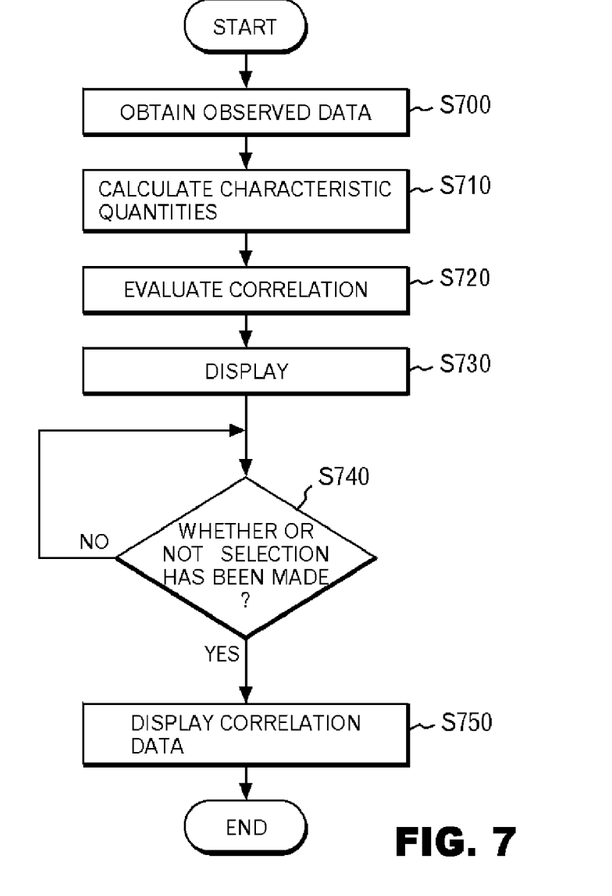
FIG. 7 shows an example of a flowchart illustrating the operation of the analysis system 30.

FIG. 7 shows an example of a flowchart illustrating the operation of the analysis system 30. The obtaining section 300 obtains a plurality of observed data from the database 20 (step S700). The calculating section 310 performs calculation on a combination of one observed data and another observed data to determine characteristic quantities indicating a non-linear correlation existing between the one and another observed data (step S710). Specifically, the calculating section 310 calculates characteristic quantities indicating symmetry of a diagram drawn by a graph, on which data values included in the plurality of observed data are plotted in a multidimensional space in which each coordinate axis represents the data value of each observed data.

The description will be given below with regard to a method of calculating characteristic quantities. The calculating section 310 calculates a plurality of predetermined characteristic quantities so as to detect a diagram drawn by a graph and nonlinear correlation for the diagram.

As a result of theoretical considerations, the inventors have found it desirable to use the two-body cross cumulants as the characteristic quantities. The cumulants are fundamental statistical quantities for statistics, and the definition thereof is provided, for example, in Akimichi Takemura and Masanobu Taniguchi, "*Basic Statistics I*", (Iwanami shoten, 2003), which has been described above. In a multivariate system, the cumulants can be those extending over different variables, such as "the cumulant of the square of $x_3$ and the first power of $x_5$". Hereinafter, $<\bullet>_c$ will be used as a representation of cumulants. When this is used, the above cumulant can be expressed as $<x_3{}^2 x_5>_c$. Just when two different types of variables are put in $<>_c$, this is called "two-body cross cumulants". It should be noted that such cumulants as $<x_3>_c$ are called neither "two-body cumulants" nor "cross cumulants".

An important fact about two-field cross cumulants is, firstly, that variable values are zero if two variables are statistically independent of each other. Two-body cross cumulants of any degree are zero, for example when two variables follow noncorrelated Gaussian distributions. The cumulants are zero, also when the two variables are of uniform distribution. Such properties are practically desirable from the viewpoint of robustness to the noise, because actual data is often noisy. The second important fact is that a traditional covariance can be expressed as $<x_i x_j>_c$, for example as for $x_i$ and $x_j$, (regardless of whether the mean value is normalized to zero or not).

The two-body cross cumulants of the lowest degree have hitherto been used under the name of covariance. However, there is no established approach for extending the notion of covariance to include non-linearities. Considering the above two facts, the inventors have found out that two-body cross cumulants of higher degrees (e.g., total degree three or higher) are useful as generalized quantities of covariance for appropriate quantities for description of nonlinear correlations.

However, two-body cross cumulants can be generally in the form of $<x_i^a x_j^b>_c$ and be infinitely defined according to the values of a and b, where a and b each denote a positive number. A general correlation, when expressed as an infinite number of two-body cross cumulants, is clearly redundant and is also impractical.

As a result of theoretical considerations, the inventors have found out that the irreducible representations of group can be used to naturally classify an infinite number of two-body cross cumulants into a finite number of two-field cross cumulants. Then, the inventors have found out that a finite number of two-body cross cumulants can be used to define desirable characteristic quantities for a quantitative grasp of nonlinear correlations. Generally, a group refers to a set of linear operators. Specifically, a closure and an associative law hold for product operation defined by the set, and also, a unit element and an inverse element exist in the set. It is also generally known that orthogonality holds for a basis of the irreducible representations of a group (see Tetsuro Inui, Yukito Tanabe and Yoshitaka Onodera, "The application of Group Theory," (Shokabo, 1976)).

The two-body cross cumulants contain two variables. Due to this fact, a two-dimensional plane can be considered to be the space which defines symmetry operations. Rotation and reflection can be considered to be natural symmetry operations. In this case, the most general group in the two-dimensional plane is called the "$C_{4V}$ group".

The description will be given below with regard to an instance where a set of symmetry operations forms the $C_{4V}$ group. However, it is to be understood that the essence of the present invention is not limited particularly to the $C_{4V}$ group but applies to any finite group. For example, three or more dimensions or a one-dimensional space may be considered to be the space that defines symmetry operation.

Figure 8:
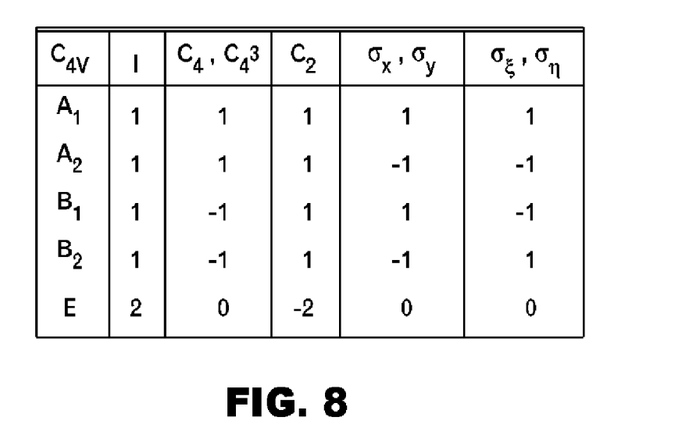
FIG. 8 shows a table of characters of a $C_{4V}$ group.

It is generally known that an appropriate representation space is chosen to assign each of the symmetry operations in the group to a matrix. The matrix is called a "representation matrix of symmetry operations", and a diagonal sum of the representation matrix is called a "character". The irreducible representation is known to be uniquely classified by the character. Hence, the character can be used to determine whether a given representation of the $C_{4V}$ group belongs to the irreducible representation, or to determine what type of representation it belongs to if it belongs to the irreducible representation. FIG. 8 shows a table of characters of the $C_{4V}$ group. Incidentally, the same or similar table is also provided in Tetsuro Inui, Yukito Tanabe and Yoshitaka Onodera, "*The application of Group Theory*," (Shokabo, 1976). The columns of the table of FIG. 8 provide a plurality of different symmetry operations forming the $C_{4V}$ group. The symmetry operations are constituted of I, $C_4(C_4{}^3)$, $C_2$, $\sigma_x(\sigma^y)$, and $\sigma_\xi(\sigma_\eta)$, which form group. As employed herein, I denotes identity transformation, $C_4$ denotes a rotation of $\pi/2$ about the origin, $C_4{}^3$ denotes a rotation of $\pi$ about the origin, $C_2$ denotes a rotation of $3\pi/2$ about the origin, $\sigma_x$ denotes a mirror image about an x-z axial plane, and $\sigma_\xi$ denotes a rotation of 45 degrees about the origin.

The rows of the table of FIG. 8 provide the characters of the irreducible representations of the group constituted of these symmetry operations. As for the $C_{4V}$ group, the irreducible representations are known to be of only five types, $A_1, A_2, B_1, B_2$ and E, which are assigned to the rows, respectively. For example, the indices corresponding to the basis $A_1$ take on one and the same value, 1, for the identity transformation, the mirror image and any of the rotations.

The calculating section 310 calculates characteristic quantities corresponding to each of the above bases through the linear combination of cross cumulants of a plurality of vector variables, where each of plural observed data is a variable value. More specifically, the calculating section 310 calculates the characteristic quantities through the linear combination of cross cumulants of first and second variables of degree one or higher, where first and second observed data are the variable values of the first and second variables, e.g., $x_i$ and $x_j$, respectively. Desirably, the calculating section 310 normalizes the mean and variance of the values of the variables $x_i$ and $x_j$ to 0 and 1, respectively, prior to calculating the characteristic quantities.

For example, the calculating section 310 uses Equations (6) to (10) to calculate the characteristic quantities.

$$C_{i,j}(B_2) = \langle x_i x_j \rangle_c \tag{6}$$

$$C_{i,j}(E_1) = \frac{1}{2}\left[\langle x_i x_j^2 \rangle_c + \langle x_i^2 x_j \rangle_c\right] \tag{7}$$

$$C_{i,j}(E_2) = \frac{1}{2}\left[\langle x_i x_j^2 \rangle_c - \langle x_i^2 x_j \rangle_c\right] \tag{8}$$

-continued $$C_{i,j}(A_1) = \langle x_i^2 x_j^2 \rangle_c \quad (9)$$

$$C_{i,j}(A_2) = \frac{1}{2}\left[\langle x_i x_j^3 \rangle_c - \langle x_i^3 x_j \rangle_c\right] \quad (10)$$

As employed in the above equations, $c_{ij}(B_2)$ denotes the characteristic quantities corresponding to the basis of the $B_2$ representation. $C_{ij}(A_1)$ denotes the characteristic quantities corresponding to the basis $A_1$, and $C_{ij}(A_2)$ denotes the characteristic quantities corresponding to the basis $A_2$. $C_{ij}(E_1)$ and $C_{ij}(E_2)$ denote the characteristic quantities corresponding to the basis E. $\langle \bullet \rangle_c$ denotes the cross cumulants. Furthermore, the variable $x_i$ is the vector variable whose variable value is one observed data. For example, this observed data is a set of observed values obtained from the first observation part of the automobile. The variable $x_j$ is the vector variable whose variable value is another observed data. For example, this observed data is a set of observed values obtained from the second observation part of the automobile.

From FIG. 8, it can be seen that each representation belongs to the specified irreducible representation. The $A_1$ representation will now be discussed as an example. By the definition of the cross cumulants, the following equation holds: $\langle x_i^2 x_j^2 \rangle_c = \langle x_i^2 x_j^2 \rangle - \langle x_i^2 \rangle \langle x_j^2 \rangle - 2\langle x_i x_j \rangle$, where $\langle \bullet \rangle$ denotes the mean. For example, for the symmetry operation $C_2$, the first term of the equation is transformed into such a form as $\langle (-x_i)^2(-x_j)^2 \rangle_c$ by the definition of the symmetry operation. However, this results in no change. The same holds for the second and third terms. As a result of the same examination as to other symmetry operations belonging to the $C_{4V}$ group, it turns out that $\langle x_i^2 x_j^2 \rangle_c$ is invariant for any symmetry operation in the $C_{4V}$ group. Since the fact of being invariant for any symmetry operation shows that the representation matrix is 1 (to be precise, a unit matrix with one row and one column) for any symmetry operation, the character is 1 for any symmetry operation. What meets this in the table of FIG. 8 is the $A_1$ representation.

In the same manner, it can be seen that the quantities given by Equations (6) to (10) have specified symmetry.

The quantities given by Equation (6) are none other than typical covariance. Specifically, the inventors have found out that other irreducible representations, which until now have not been used, can be effectively used as the characteristic quantities indicating the correlation, based on the findings that the typical covariance actually belongs to the $B_2$ irreducible representation in the $C_{4V}$ group.

As previously mentioned, it is to be understood that this type of mathematical logic is not limited to the $C_{4V}$ group. When a pattern is given to represent a correlation between a plurality of variables, a group can be used to characterize the pattern. Specifically, quantitative description of the pattern can be accomplished by defining such characteristic quantities as may realize the irreducible representation of the group.

Preferably, $x_i$ and $x_j$ of low degree are used because $x_i$ and $x_j$ of high degree are generally susceptible to outliers. As a result of the inventors' considerations, it has been found out that it is preferable that $x_i$ and $x_j$ be of positive degree and of total degree four or lower. However, it is to be understood that the present invention is not limited to the variables of degree four or lower. As for data having few outliers, cross cumulants of high degree may be used to define the same or similar characteristic quantities.

Preferably, the calculating section 310 may further divide the calculated characteristic quantities by Equation (11) in order that the variables may be of one and the same degree to determine the characteristic quantities corresponding to each of the bases.

$$[\langle x^2 \rangle \langle y^2 \rangle]^{k/4} \quad (11)$$

As employed in Equation (11), k denotes the degree of the cumulants. Specifically, the calculating section 310 divides Equation (6) by Equation (11) where k=2, and divides Equations (7) and (8) by Equation (11) where k=3. The calculating section 310 also divides Equations (9) and (10) by Equation (11) where k=4.

Returning now to FIG. 7, the evaluating section 320 then evaluates the correlation between the plurality of observed data, based on the calculated characteristic quantities (step S720). For example, the evaluating section 320 can detect a combination of observed data in which the differential value between the characteristic quantities recorded in the recording section 330 and the characteristic quantities calculated by the calculating section 310 is larger than the predetermined reference value as the combination of observed data indicating a part causing an abnormal condition in the observation object. The results of detection are displayed in the window 600 in diagrammatic or colored form in the two-dimensional plane (step S730), as previously mentioned with reference to FIG. 6. In response to selection of a given part in the two-dimensional plane (YES at step S740), the display control section 340 provides display so that a graph showing a correlation between observed data corresponding to the selected part is displayed in the window 610 (step S750).

As described above, the processing shown in FIG. 7 enables the intuitive display of a possible part causing an abnormal condition, based on the correlation between the observed data.

Figure 9:
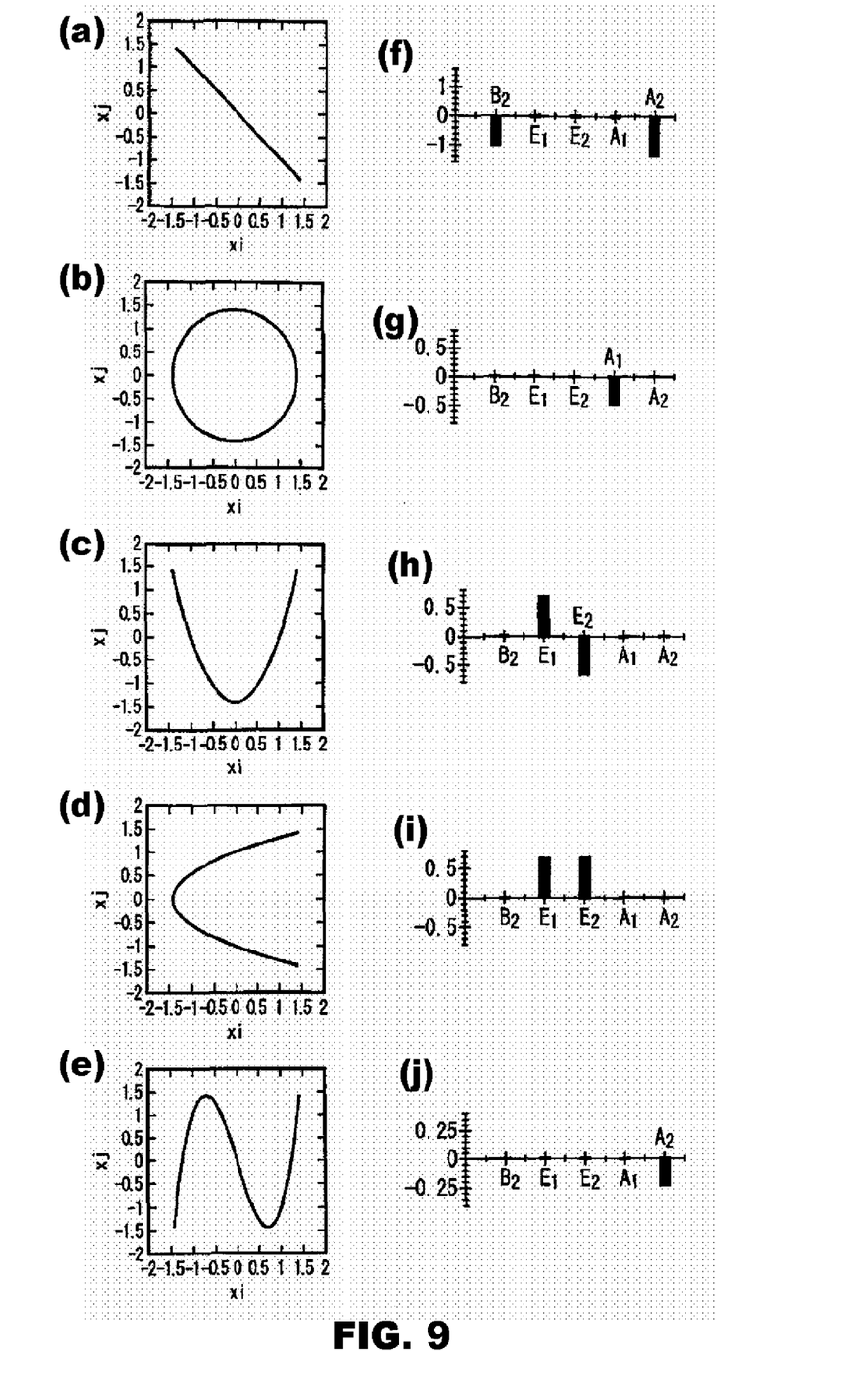
FIGS. 9A to 9J show specific examples of characteristic quantities of observed data.

FIGS. 9A to 9J show specific examples of characteristic quantities of observed data. FIG. 9A shows a graph, which is obtained as a result of plotting the variable values of the variables $x_i$ and $x_j$ when the variable $x_i$ has a negative linear correlation with the variable $x_j$. FIG. 9F corresponds to FIG. 9A, showing characteristic quantities indicating symmetry of a diagram drawn by the graph of FIG. 9A. Since this diagram is in a so-called inverse correlation, the characteristic quantities corresponding to the basis $B_2$ take on the known value, −1.

FIG. 9B shows a graph, which is obtained as a result of plotting the variable values of the variables $x_i$ and $x_j$ in a different situation from the situation shown in FIG. 9A. FIG. 9G corresponds to FIG. 9B, illustrating characteristic quantities indicating symmetry of a diagram drawn by the graph of FIG. 9B. As shown in FIG. 9B, the diagram in circular form is drawn by the variable values of the variables $x_i$ and $x_j$. This is a classic example in which a typical correlation coefficient is zero although there is a strong correlation between two variables. Actually, the conventional covariance ($B_2$) takes on the zero value. In other words, no information is given as to the correlation between the two variables. However, it can be seen that the characteristic quantities corresponding to $A_1$ take on the nonzero value and can act as the quantitative character to measure the correlation.

FIG. 9C shows a graph, which is obtained as a result of plotting the variable values of the variables $x_i$ and $x_j$ in another different situation. FIG. 9H corresponds to FIG. 9C, illustrating characteristic quantities indicating symmetry of a diagram drawn by the graph of FIG. 9C. Also in this situation, the characteristic quantities corresponding to the traditional covariance, $B_2$, give no information as to the correlation between the two variables. On the other hand, it can be seen that $E_1$ and $E_2$ of the characteristic quantities newly defined give the significant values as the character of the correlation.

FIG. 9D shows a graph, which is obtained as a result of plotting the variable values of the variables $x_i$ and $x_j$ in still another different situation. FIG. 9I corresponds to FIG. 9D, illustrating characteristic quantities of a diagram drawn by the graph of FIG. 9D. Also in this situation, the characteristic quantities corresponding to the traditional covariance, $B_2$, give no information as to the correlation between the two variables. On the other hand, it can be seen that $E_1$ and $E_2$ of the characteristic quantities newly defined give the significant values as the character of the correlation.

FIG. 9E shows a graph, which is obtained as a result of plotting the variable values of the variables $x_i$ and $x_j$ in a further different situation. FIG. 9J corresponds to FIG. 9E, illustrating characteristic quantities of a diagram drawn by the graph of FIG. 9E. Also in this situation, the characteristic quantities corresponding to the traditional covariance, $B_2$, give no information as to the correlation between the two variables. On the other hand, it can be seen that $A_2$ of the characteristic quantities newly defined gives the significant value as the character of the correlation.

As described above, the characteristic quantities calculated by the system according to the embodiment enable an adequate grasp of a correlation represented in diagrammatic form in the multidimensional space in which each variable is represented as the coordinate value.

Figure 10:
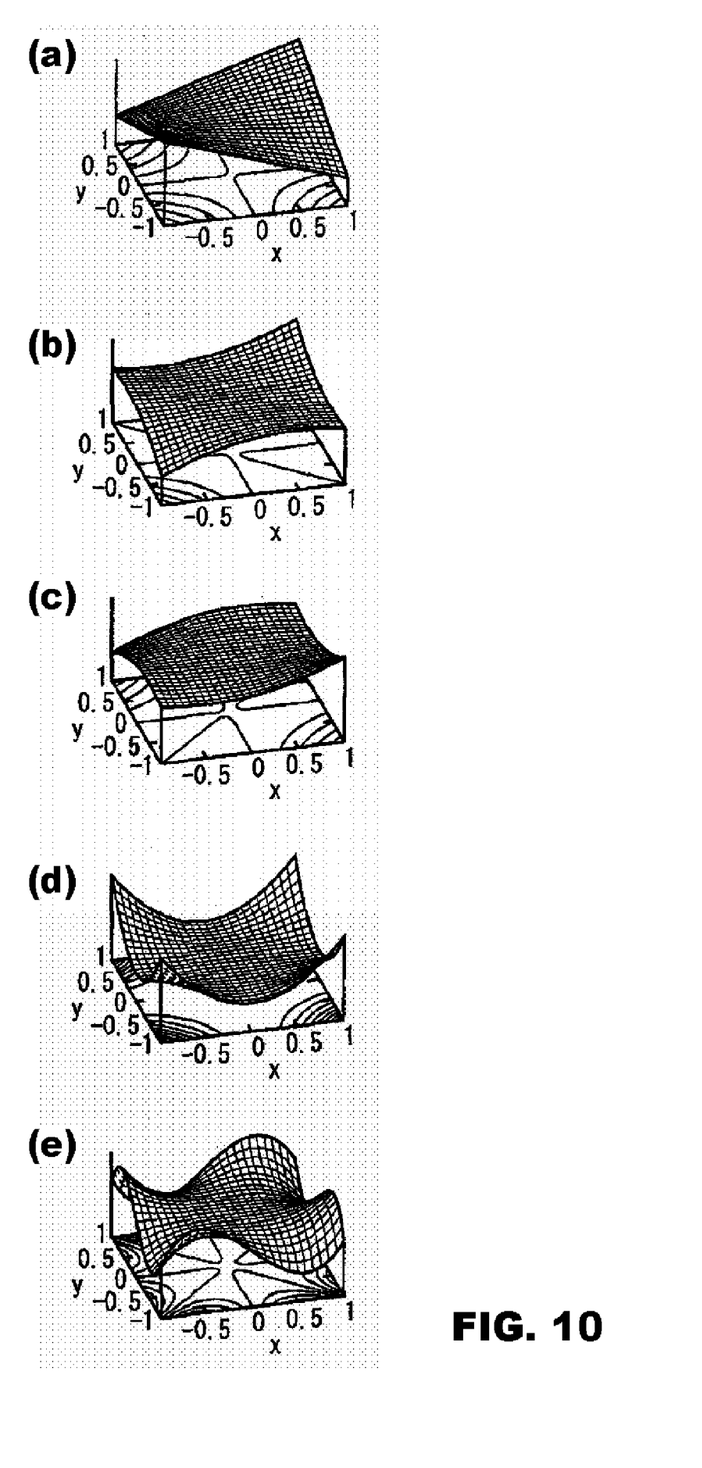
FIGS. 10A to 10E are graphs showing the properties of calculated characteristic quantities.

FIGS. 10A to 10E are graphs showing the properties of the calculated characteristic quantities. In the graphs, $x_i$ and $x_j$ in Equations (6) to (10) are taken as x and y, respectively, and the values given by the equations are taken as the z-coordinate values. FIG. 10A shows the properties of the principal term of the basis $B_2$. The principal term of cross cumulants $<x_i^a x_j^b>_c$ is $x_i^a x_j^b$, where a and b each denote a real number. In FIG. 10A, $x_i$ and $x_j$ are represented as x and y, respectively, for sake of simplicity. Specifically, FIG. 10A shows a surface expressed in equation form as: z=xy, where z represents the vertical axis. FIGS. 10B and 10C show the principal terms of the bases $E_1$ and $E_2$, respectively. The characteristic quantities corresponding to the bases $E_1$ and $E_2$ can be considered to characterize asymmetry of distribution, as shown in FIGS. 10B and 10C.

FIG. 10D shows the principal term of the basis $A_1$. The characteristic quantities corresponding to the basis $A_1$ can be considered to characterize a doughnut-shaped distribution, as shown in FIG. 10D. FIG. 10E shows the principal term of the basis $A_2$. The characteristic quantities corresponding to the basis $A_2$ can be considered to characterize a somewhat warped correlation shaped like a swastika, as shown in FIG. 10E.

Figure 11:
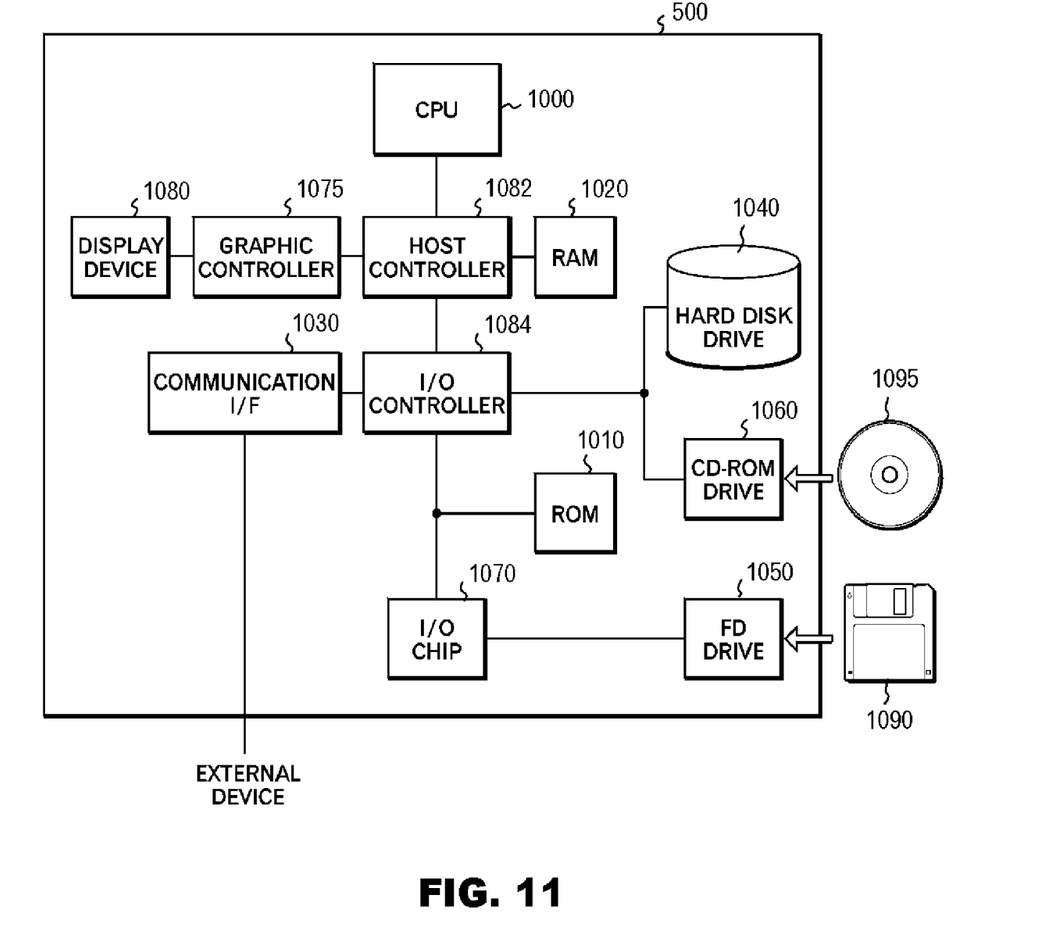
FIG. 11 shows an example of a hardware configuration of an information processing apparatus 500 which functions as the analysis system 30.

FIG. 11 shows an example of a hardware configuration of an information processing apparatus 500 which functions as the analysis system 30. The information processing apparatus 500 includes CPU and its peripheral devices including a CPU 1000, a RAM (random access memory) 1020, and a graphic controller 1075, which are connected to one another via a host controller 1082; input/output devices including a communication interface 1030, a hard disk drive 1040, and a CD-ROM drive 1060, which are connected to the host controller 1082 via an input/output controller 1084; and legacy input/output devices including a ROM (read only memory) 1010, a flexible disk drive 1050, and an input/output chip 1070, which are connected to the input/output controller 1084.

The host controller 1082 provides connection between the RAM 1020 and the CPU 1000 and graphic controller 1075 which access the RAM 1020 at high transfer rate. The CPU 1000 operates and controls each device in accordance with programs stored in the ROM 1010 and the RAM 1020. The graphic controller 1075 acquires image data which the CPU 1000 or the like generates in frame buffers within the RAM 1020, and the image data is displayed on a display device 1080 under control of the graphic controller 1075. Alternatively, the graphic controller 1075 may contain frame buffers to store image data generated by the CPU 1000 or the like.

The input/output controller 1084 connects the host controller 1082 to the communication interface 1030, the hard disk drive 1040, and the CD-ROM drive 1060, which are the relatively high-speed input/output devices. The communication interface 1030 communicates with an external device via a network. The hard disk drive 1040 stores a program and data, which are used by the information processing apparatus 500. The CD-ROM drive 1060 reads in a program or data from a CD-ROM 1095 and provides the program or data to the RAM 1020 or the hard disk drive 1040.

The input/output controller 1084 has connections to the ROM 1010 and the relatively low-speed input/output devices such as the flexible disk drive 1050 and the input/output chip 1070. The ROM 1010 stores a boot program which the CPU 1000 executes at the time of activation of the information processing apparatus 500, a hardware-dependent program of the information processing apparatus 500, and the like. The flexible disk drive 1050 reads in a program or data from a flexible disk 1090 and provides the program or data to the RAM 1020 or the hard disk drive 1040 via the input/output chip 1070. The input/output chip 1070 has connections to various input/output devices via the flexible disk 1090, and, for example, a parallel port, a serial port, a keyboard port, a mouse port, and the like.

The program provided for the information processing apparatus 500 is stored in a recording medium such as the flexible disk 1090, the CD-ROM 1095, or an IC card and is provided by users. The program is read out from the recording medium and is installed and executed in the information processing apparatus 500 via the input/output chip 1070 and/or the input/output controller 1084. The program works on the information processing apparatus 500 or the like for the apparatus 500 to operate. Since the operation of the information processing apparatus 500 is the same as the operation of the analysis system 30 as described with reference to FIGS. 1 to 10E, the description of the operation is omitted.

The above-mentioned program may be stored in an external storage medium. Besides the flexible disk 1090 and the CD-ROM 1095, an optical recording medium such as a DVD (digital versatile disk) or a PD (phase change rewritable disk), a magneto-optical recording medium such as an MD (mini disk), a tape medium, a semiconductor memory such as an IC card, or the like can be used as the storage medium. A storage or memory such as a hard disk or a RAM in a server system connected to a dedicated communication network or the Internet may be also used as a recording medium to provide the program to the information processing apparatus 500 via the network.

As described above, the information processing system 10 according to the embodiment can detect a correlation between a plurality of time-series data, which has been undetectable with the conventional techniques. The correlation is evaluated by using the characteristic quantities of a diagram drawn by plotting the time-series data in a coordinate plane. This permits proper evaluation of a nonlinear correlation, as well as a linear correlation which until now has been generally used.

Although the present invention has been described above by referring to the embodiment, the technical scope of the invention is not limited to the above-mentioned embodiment.

It is obvious to those skilled in this art that various modifications and improvements can be added to the aforementioned embodiment. It is clearly understood from description of the scope of claims that embodiments which are obtained by adding any of such various modifications and improvements to the aforementioned embodiment are also included in the technical scope of the present invention.

The present invention enables detecting a correlation between a plurality of time-series data, which has been undetectable with the conventional techniques.

Although the preferred embodiment of the present invention has been described in detail, it should be understood that various changes, substitutions and alternations can be made therein without departing from spirit and scope of the inventions as defined by the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

That which is claimed is:

1. A computer-implemented method of evaluating a correlation between a plurality of time-series data, operable in an information processing system, comprising the steps of:
    obtaining a plurality of observed data from a database stored on a computer, the observed data including time-series data;
    executing a program resident and operable in the information processing system comprising a computer with a central processing unit to:
        calculate two-body cross cumulants of degree three or higher, the calculated two-body cross cumulants indicating a nonlinear correlation existing between a first time-series data and a second time-series data, the first and second time-series data being obtained as a result of observing, in time sequence, each part of an observation object, for each combination of the first time-series data and the second time-series data;
        prerecord, in a record section, two-body cross cumulants indicating a correlation existing between a first time-series data and a second time-series data under normal conditions;
        determine a combination of time-series data in which a differential value between the prerecorded two-body cross cumulants and the calculated two-body cross cumulants is larger than a predetermined reference value, the determined combination of time series data indicating a part causing an abnormal condition in the observation object; and
        output the determined combination of time series data indicating a part causing an abnormal condition for display at a user terminal.

2. The method according to claim 1, wherein
    the step to prerecord includes the step of prerecording two-body cross cumulants indicating a correlation existing between the first time-series data and a second time-series data in the record section, regarding the plurality of time-series data being obtained as the result of observing, in time sequence, each part of a normal observation object.

3. The method according to claim 1, further comprising the steps of:
    relating an x axis to the first time-series data and a y axis to the second time-series data on a two-dimensional coordinate plane, and
    displaying a diagram showing the differential value between characteristic quantities obtained by performing calculation on the combination of the first time-series data and the second time-series data on the two-dimensional coordinate plane, respectively.

* * * * *